US012593008B2

(12) United States Patent
Hoang et al.

(10) Patent No.: US 12,593,008 B2
(45) Date of Patent: *Mar. 31, 2026

(54) USER INTERFACE TILE ARRANGEMENT BASED ON RELATIVE LOCATIONS

(71) Applicant: Zoom Communications, Inc., San Jose, CA (US)

(72) Inventors: Anthony Bao Quoc Hoang, San Francisco, CA (US); Cynthia Eshiuan Lee, Austin, TX (US); Jeffrey William Smith, Layton, UT (US); Chi-chian Yu, San Ramon, CA (US)

(73) Assignee: Zoom Communications, Inc., San Jose, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 18/456,994

(22) Filed: Aug. 28, 2023

(65) Prior Publication Data

US 2023/0412763 A1     Dec. 21, 2023

Related U.S. Application Data

(63) Continuation of application No. 17/472,534, filed on Sep. 10, 2021, now Pat. No. 11,843,898.

(51) Int. Cl.
*H04N 7/15*          (2006.01)
*G06F 3/04845*          (2022.01)
(Continued)

(52) U.S. Cl.
CPC ........... *H04N 7/15* (2013.01); *G06F 3/04845* (2013.01); *H04L 12/1822* (2013.01); *H04L 65/1083* (2013.01); *H04L 65/403* (2013.01)

(58) Field of Classification Search
CPC .. G06F 3/04845; G06F 3/0482; G06F 3/0483; G06F 3/0488; G06F 40/232;
(Continued)

(56) References Cited

U.S. PATENT DOCUMENTS 7,428,000 B2     9/2008   Cutler et al.
7,668,907 B1     2/2010   Janakiraman et al.
(Continued)

FOREIGN PATENT DOCUMENTS

GB          2594761 B          5/2022
WO     2021243633 A1     12/2021
(Continued)

OTHER PUBLICATIONS

International Search Report and Written Opinion mailed on Jul. 4, 2022 in corresponding PCT Application No. PCT/US2022/024820.
(Continued)

*Primary Examiner* — Gerald Gauthier
(74) *Attorney, Agent, or Firm* — Young Basile Hanlon & MacFarlane, P.C.

(57)          ABSTRACT

User interface (UI) tiles of conference participants are arranged in a UI of conferencing software according to relative locations of those conference participants within a conference room. Positional information and video data are obtained from one or more video capture devices located within a conference room. Relative locations of conference participants within the conference room are determined based on the positional information, such as by defining coordinates for the conference participants within a coordinate system based on the positional information and the video data and determining the relative locations based on the coordinates. Output configured to cause a client application to arrange UI tiles associated with the conference participants is generated according to the relative locations. The output is then transmitted to one or more client devices to cause a UI of conferencing software at each of those client devices to display the UI tiles in the specified arrangement.

20 Claims, 9 Drawing Sheets

(51) Int. Cl.
*H04L 12/18* (2006.01)
*H04L 65/1083* (2022.01)
*H04L 65/403* (2022.01)

(58) Field of Classification Search
CPC ......... G06T 5/80; G06T 7/269; G06T 15/205; G06T 19/006; G06V 40/20; H04L 12/1822; H04L 12/1827; H04L 51/10; H04L 51/52; H04L 65/1083; H04L 65/403; H04L 65/765; H04L 67/52; H04M 1/724; H04M 3/565; H04N 7/08; H04N 7/142; H04N 7/147; H04N 7/15; H04N 21/237; H04N 21/4622; H04N 7/157; H04N 21/41407; H04N 17/004; A63F 13/5255
USPC ........................................................ 709/204
See application file for complete search history.

(56) References Cited

U.S. PATENT DOCUMENTS

| | | | |
|---|---|---|---|
| 8,150,155 B2 | 4/2012 | El-Maleh et al. | |
| 8,624,955 B2* | 1/2014 | Watson .................. | H04N 7/147 |
| | | | 709/204 |
| 8,797,376 B2* | 8/2014 | Saleh ....................... | H04N 7/15 |
| | | | 348/14.07 |
| 8,842,161 B2 | 9/2014 | Feng et al. | |
| 8,878,893 B2* | 11/2014 | Andresen ................. | H04N 7/15 |
| | | | 348/14.03 |
| 9,055,189 B2 | 6/2015 | Su | |
| 9,100,540 B1 | 8/2015 | Gates et al. | |
| 9,237,307 B1 | 1/2016 | Vendrow | |
| 9,294,726 B2 | 3/2016 | Decker et al. | |
| 9,591,479 B1 | 3/2017 | Leavy et al. | |
| 9,706,171 B1 | 7/2017 | Riley et al. | |
| 9,769,424 B2 | 9/2017 | Michot | |
| 9,774,823 B1 | 9/2017 | Gadnir et al. | |
| 9,858,936 B2 | 1/2018 | Cartwright et al. | |
| 9,942,518 B1 | 4/2018 | Tangeland et al. | |
| 10,057,707 B2 | 8/2018 | Cartwright et al. | |
| 10,104,338 B2 | 10/2018 | Goesnar | |
| 10,187,579 B1 | 1/2019 | Wang et al. | |
| 10,440,325 B1 | 10/2019 | Boxwell et al. | |
| 10,516,852 B2 | 12/2019 | Theien et al. | |
| 10,522,151 B2 | 12/2019 | Cartwright et al. | |
| 10,574,899 B2 | 2/2020 | Wang et al. | |
| 10,778,941 B1 | 9/2020 | Childress, Jr. et al. | |
| 10,904,485 B1 | 1/2021 | Childress, Jr. et al. | |
| 10,939,045 B2 | 3/2021 | Wang et al. | |
| 10,991,108 B2 | 4/2021 | Schnittman et al. | |
| 11,064,256 B1 | 7/2021 | Voss et al. | |
| 11,076,127 B1 | 7/2021 | Schaefer et al. | |
| 11,082,661 B1 | 8/2021 | Pollefeys | |
| 11,165,597 B1 | 11/2021 | Matsuguma et al. | |
| 11,212,129 B1 | 12/2021 | Sipcic et al. | |
| 11,350,029 B1 | 5/2022 | Ostap et al. | |
| 11,677,907 B2* | 6/2023 | Goggins ................. | H04L 67/52 |
| | | | 348/14.08 |
| 11,722,639 B2* | 8/2023 | Jiang ..................... | H04N 7/147 |
| | | | 348/14.08 |
| 11,736,660 B2 | 8/2023 | Smith et al. | |
| 11,765,318 B2* | 9/2023 | Kies .................... | A63F 13/5255 |
| | | | 348/14.08 |
| 11,843,898 B2* | 12/2023 | Hoang ................... | H04N 7/147 |
| 2002/0113862 A1 | 8/2002 | Center et al. | |
| 2005/0078171 A1* | 4/2005 | Firestone ............ | H04L 12/1822 |
| | | | 348/E7.083 |
| 2005/0081160 A1 | 4/2005 | Wee et al. | |
| 2006/0092269 A1* | 5/2006 | Baird ................. | H04N 21/4622 |
| | | | 348/E7.083 |
| 2006/0244817 A1* | 11/2006 | Harville ................... | H04N 7/15 |
| | | | 348/E7.083 |
| 2007/0285504 A1* | 12/2007 | Hesse ....................... | H04N 7/15 |
| | | | 348/E7.083 |

| | | | |
|---|---|---|---|
| 2008/0184115 A1* | 7/2008 | Back et al. | |
| 2008/0273078 A1* | 11/2008 | Grasley .................. | H04N 7/147 |
| | | | 348/E7.083 |
| 2008/0297586 A1* | 12/2008 | Kurtz ................... | H04L 12/1827 |
| | | | 348/E7.083 |
| 2008/0297587 A1* | 12/2008 | Kurtz ..................... | G06V 40/20 |
| | | | 348/E7.083 |
| 2008/0297588 A1* | 12/2008 | Kurtz ..................... | H04N 7/147 |
| | | | 348/E7.083 |
| 2008/0297589 A1* | 12/2008 | Kurtz ...................... | H04N 7/15 |
| | | | 348/E7.083 |
| 2009/0015658 A1* | 1/2009 | Enstad ..................... | H04N 7/15 |
| | | | 348/240.99 |
| 2009/0147070 A1* | 6/2009 | Marathe .................. | H04L 51/10 |
| | | | 348/E7.083 |
| 2009/0207233 A1* | 8/2009 | Mauchly .................. | H04N 7/15 |
| | | | 348/14.09 |
| 2009/0210491 A1* | 8/2009 | Thakkar .............. | H04L 12/1822 |
| | | | 709/204 |
| 2010/0118112 A1* | 5/2010 | Nimri .................... | H04N 7/142 |
| | | | 348/E7.083 |
| 2010/0123770 A1 | 5/2010 | Friel et al. | |
| 2010/0238262 A1 | 9/2010 | Kurtz et al. | |
| 2011/0085017 A1* | 4/2011 | Robinson ................. | H04N 7/15 |
| | | | 348/E7.083 |
| 2011/0279631 A1* | 11/2011 | Ranganath ............ | H04M 3/565 |
| | | | 348/E7.083 |
| 2011/0285808 A1 | 11/2011 | Feng et al. | |
| 2012/0093365 A1* | 4/2012 | Aragane .................. | G06T 5/80 |
| | | | 348/E7.078 |
| 2012/0212668 A1 | 8/2012 | Schultz et al. | |
| 2012/0293606 A1 | 11/2012 | Watson et al. | |
| 2013/0027505 A1* | 1/2013 | Ranganath .......... | H04L 12/1827 |
| | | | 348/E7.083 |
| 2013/0076853 A1* | 3/2013 | Diao ...................... | H04N 7/157 |
| | | | 348/E7.083 |
| 2013/0083153 A1* | 4/2013 | Lindbergh ............... | H04N 7/15 |
| | | | 348/E7.083 |
| 2013/0088565 A1 | 4/2013 | Buckler | |
| 2013/0194374 A1* | 8/2013 | Kieft ........................ | H04N 7/15 |
| | | | 348/E7.083 |
| 2013/0198629 A1 | 8/2013 | Tandon et al. | |
| 2013/0321564 A1* | 12/2013 | Smith ................... | G06T 15/205 |
| | | | 348/14.08 |
| 2013/0342636 A1* | 12/2013 | Tian ........................ | G06T 7/269 |
| | | | 348/14.08 |
| 2014/0002582 A1* | 1/2014 | Bear ................ | H04N 21/41407 |
| | | | 348/E7.083 |
| 2014/0267561 A1* | 9/2014 | Ahuja .................. | H04N 17/004 |
| | | | 348/14.08 |
| 2014/0267562 A1* | 9/2014 | Lemmey ................. | H04L 51/10 |
| | | | 348/14.08 |
| 2014/0267563 A1* | 9/2014 | Baca .................... | H04N 21/237 |
| | | | 348/14.08 |
| 2014/0282166 A1* | 9/2014 | Temkin ............... | G06F 3/04845 |
| | | | 715/769 |
| 2015/0085065 A1* | 3/2015 | Sun ........................ | H04N 7/142 |
| | | | 348/14.08 |
| 2015/0181164 A1* | 6/2015 | Yang ........................ | H04N 7/15 |
| | | | 348/14.08 |
| 2015/0195489 A1* | 7/2015 | Sobti ..................... | H04N 7/142 |
| | | | 348/14.08 |
| 2016/0057385 A1 | 2/2016 | Burenius | |
| 2016/0073055 A1 | 3/2016 | Marsh | |
| 2016/0105642 A1* | 4/2016 | Nagase ................. | H04M 1/724 |
| | | | 348/14.08 |
| 2016/0173823 A1 | 6/2016 | Duckworth et al. | |
| 2016/0277712 A1 | 9/2016 | Michot | |
| 2017/0094222 A1 | 3/2017 | Tangeland et al. | |
| 2017/0099461 A1 | 4/2017 | Nimri et al. | |
| 2017/0140791 A1 | 5/2017 | Das et al. | |
| 2018/0063206 A1 | 3/2018 | Faulkner et al. | |
| 2018/0063479 A1 | 3/2018 | Nimri et al. | |
| 2018/0063480 A1 | 3/2018 | Luks et al. | |
| 2018/0098026 A1 | 4/2018 | Gadnir et al. | |
| 2018/0124136 A1 | 5/2018 | Faulkner et al. | |
| 2018/0225852 A1 | 8/2018 | Um et al. | |

(56) References Cited

U.S. PATENT DOCUMENTS

| | | | |
|---|---|---|---|
| 2018/0232920 A1 | 8/2018 | Faulkner et al. | |
| 2019/0215464 A1* | 7/2019 | Kumar | H04N 7/08 |
| 2019/0222892 A1 | 7/2019 | Faulkner et al. | |
| 2019/0250968 A1* | 8/2019 | Bemanian | G06F 40/232 |
| 2019/0324986 A1* | 10/2019 | Schwartz | G06F 3/0483 |
| 2019/0341050 A1 | 11/2019 | Diamant et al. | |
| 2020/0099890 A1 | 3/2020 | Tanaka et al. | |
| 2020/0126513 A1 | 4/2020 | Lau et al. | |
| 2020/0260049 A1 | 8/2020 | Erna | |
| 2020/0267427 A1 | 8/2020 | Rogers et al. | |
| 2020/0275058 A1 | 8/2020 | Graham et al. | |
| 2020/0403817 A1 | 12/2020 | Daredia et al. | |
| 2021/0120208 A1 | 4/2021 | Morris et al. | |
| 2021/0181930 A1* | 6/2021 | Gurule | G06F 3/04845 |
| 2021/0235040 A1 | 7/2021 | Childress, Jr. et al. | |
| 2021/0405865 A1 | 12/2021 | Faulkner | |
| 2021/0409893 A1 | 12/2021 | Sommer | |
| 2022/0060660 A1 | 2/2022 | Chou et al. | |
| 2022/0086390 A1 | 3/2022 | Erna et al. | |
| 2022/0141259 A1* | 5/2022 | Copley | H04L 65/765 |
| | | | 348/14.08 |
| 2022/0253025 A1* | 8/2022 | Piaskowski | G06F 3/0482 |
| 2022/0319032 A1 | 10/2022 | Fan et al. | |
| 2022/0319034 A1 | 10/2022 | Fan et al. | |
| 2022/0353465 A1 | 11/2022 | Smith | |
| 2022/0374136 A1* | 11/2022 | Chang | G06F 3/0488 |
| 2022/0400216 A1 | 12/2022 | Wang et al. | |
| 2023/0081717 A1* | 3/2023 | Hoang | H04N 7/15 |
| | | | 348/14.08 |
| 2023/0412763 A1* | 12/2023 | Hoang | G06F 3/04845 |

FOREIGN PATENT DOCUMENTS

| | | |
|---|---|---|
| WO | 2022046810 A2 | 3/2022 |
| WO | 2022078656 A1 | 4/2022 |

OTHER PUBLICATIONS

International Search Report and Written Opinion mailed on Jul. 25, 2022 in corresponding PCT Application Numbber PCT/US2022/024822.

International Search Report and Written Opinion mailed on Dec. 22, 2022 in corresponding PCT Application No. PCT/US2022/042860.

International Search Report and Written Opinion mailed on May 8, 2023 in corresponding PCT Application No. PCT/US2023/011368.

Paul Chippendale and Oswald Lanz: "Optimised Meeting Recording and Annotation Using Real-Time Video Analysis", in: Andrej Popescu-Selis: "Machine Learning for Multimodal Interaction", Proc. of 5th MLMI workshop, Sep. 10, 2008 (Sep. 10, 2008), pp. 109-120, XP055543840, Internet Retrieved from the Internet: URL:https://link.springer.com/content/pdf/10.1007/978-3-540-85853-9.pdf [retrieved on Jan. 17, 2019].

Rasmussen Troels Ammitsbol et al: "SceneCam: Improving Multti-camera Remote Collaboration using Augmented Reality", 2019 IEEE International Symposium on Mixed and Augmented Reality Adjunct (!SMAR-ADJUNCT), IEEE, Oct. 10, 2019 (Oct. 10, 2019), pp. 28-33, XP033688529, DOI: 10.1109/ISMAR-ADJUNCT.2019.00023 [retrieved on Jan. 7, 2020].

* cited by examiner

700

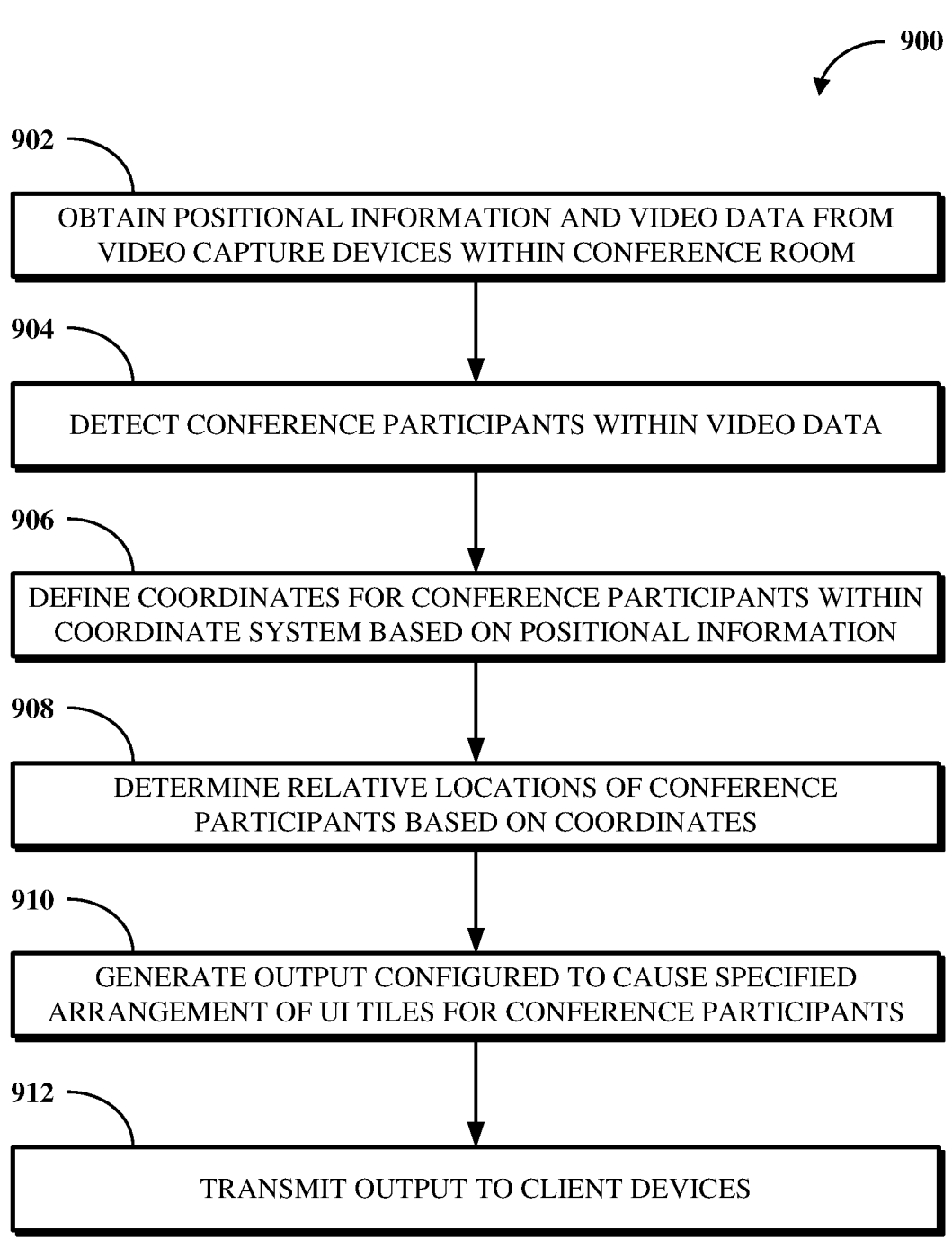

900

902

OBTAIN POSITIONAL INFORMATION AND VIDEO DATA FROM VIDEO CAPTURE DEVICES WITHIN CONFERENCE ROOM

904

DETECT CONFERENCE PARTICIPANTS WITHIN VIDEO DATA

906

DEFINE COORDINATES FOR CONFERENCE PARTICIPANTS WITHIN COORDINATE SYSTEM BASED ON POSITIONAL INFORMATION

908

DETERMINE RELATIVE LOCATIONS OF CONFERENCE PARTICIPANTS BASED ON COORDINATES

910

GENERATE OUTPUT CONFIGURED TO CAUSE SPECIFIED ARRANGEMENT OF UI TILES FOR CONFERENCE PARTICIPANTS

912

TRANSMIT OUTPUT TO CLIENT DEVICES

FIG. 9

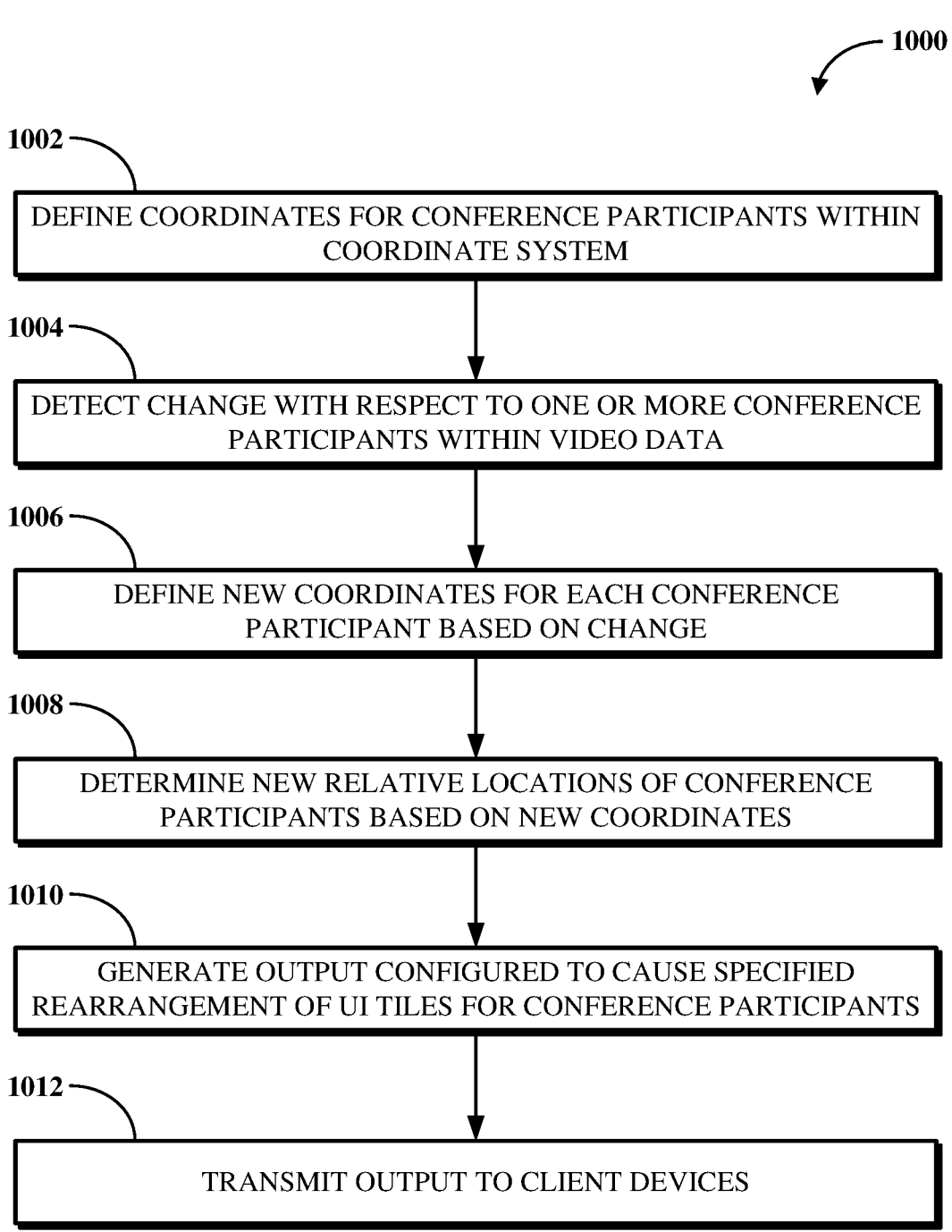

1000

1002

DEFINE COORDINATES FOR CONFERENCE PARTICIPANTS WITHIN COORDINATE SYSTEM

1004

DETECT CHANGE WITH RESPECT TO ONE OR MORE CONFERENCE PARTICIPANTS WITHIN VIDEO DATA

1006

DEFINE NEW COORDINATES FOR EACH CONFERENCE PARTICIPANT BASED ON CHANGE

1008

DETERMINE NEW RELATIVE LOCATIONS OF CONFERENCE PARTICIPANTS BASED ON NEW COORDINATES

1010

GENERATE OUTPUT CONFIGURED TO CAUSE SPECIFIED REARRANGEMENT OF UI TILES FOR CONFERENCE PARTICIPANTS

1012

TRANSMIT OUTPUT TO CLIENT DEVICES

FIG. 10

USER INTERFACE TILE ARRANGEMENT BASED ON RELATIVE LOCATIONS

CROSS-REFERENCE TO RELATED APPLICATION(S)

This application is a continuation of U.S. patent application Ser. No. 17/472,534, filed Sep. 10, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for user interface (UI) tile arrangement based on relative locations of conference participants.

One aspect of this disclosure is a method, which includes obtaining positional information associated with one or more video capture devices within a conference room, determining relative locations of conference participants within the conference room based on the positional information, and generating output configured to cause a client application to arrange UI tiles associated with the conference participants according to the relative locations.

Another aspect of this disclosure is an apparatus, which includes a memory and a processor configured to execute instructions stored in the memory to obtain positional information associated with one or more video capture devices within a conference room, determine relative locations of conference participants within the conference room based on the positional information, and generate output configured to cause a client application to arrange UI tiles associated with the conference participants according to the relative locations.

Yet another aspect of this disclosure is a non-transitory computer readable medium storing instructions operable to cause one or more processors to perform operations, which include obtaining positional information associated with one or more video capture devices within a conference room, determining relative locations of conference participants within the conference room based on the positional information, and generating output configured to cause a client application to arrange UI tiles associated with the conference participants according to the relative locations.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a flowchart of an example of a technique for UI tile arrangement based on relative locations of conference participants within a conference room.

FIG. 10 is a flowchart of an example of a technique for rearranging UI tiles based on changes of or to conference participants within a conference room.

DETAILED DESCRIPTION

Figure 1:
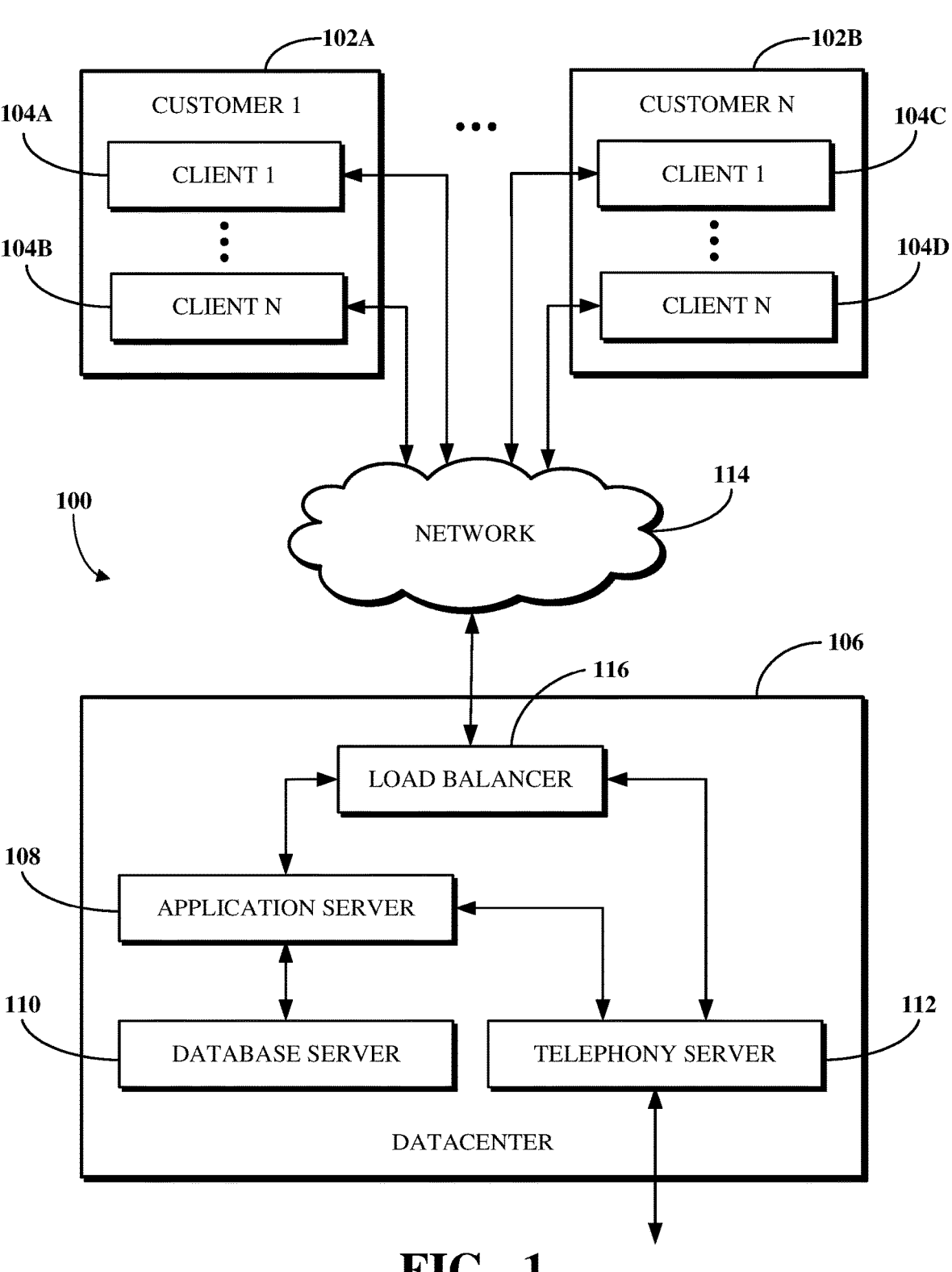
FIG. 1 is a block diagram of an example of an electronic computing and communications system.

Conferencing software is frequently used across a multitude of industries to support conferences between participants in multiple locations. Generally, one or more of the conference participants is physically located in a conference room, for example, in an office setting, and remaining conference participants may be connecting to the conferencing software from one or more remote locations. Conferencing software thus enables people to conduct conferences without requiring them to be physically present with one another. Conferencing software may be available as a standalone software product or it may be integrated within a software platform, such as a UCaaS platform.

Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are connected to a computing device which transmits streams thereof to a server that implements the conferencing software. The conferencing software then renders an output video stream based on the video feed from the camera within a view of the conferencing software and introduces an audio feed from the one or more microphones within an audio channel of the conference.

Conferencing software conventionally includes a number of UI tiles in which video feeds received from the various connected devices are separately rendered. Conference participants remotely connecting to the conferencing software for a conference are represented within a UI of the conferencing software using individualized UI tiles based on the video feeds received from their devices. In contrast, because a single video feed is received from the camera within a conference room, conference participants who are physically located within the conference room generally are all represented within the same UI tile. However, the use of a single UI tile to show all participants within a conference room may limit the contribution that those participants have to the overall conference experience over the conferencing software. For example, a conference participant located somewhere in the conference room will not be given the same amount of focus within the UI of the conferencing software, which includes all of the UI tiles, as someone who is front and center within their own individualized UI tile. In another example, conversations between participants within the conference room may be missed or misattributed to others by remote participants who are not present in the conference room.

Nevertheless, even where each conference participant within a conference room can be represented using individualized UI tiles, the individualized UI tiles for the conference participants within the conference room may be presented within the UI of the conferencing software in a manner which is confusing to remote conference participants. In particular, video streams obtained from the cameras within the conference room can be processed to separate out regions of interest corresponding to individual conference participants. Those regions of interest may then be rendered within individualized UI tiles within the UI of the conferencing software. However, conferencing software is conventionally configured to simply append a next UI tile to an end of the UI tile layout without regard to a particular arrangement of the UI tiles. As such, UI tiles for conference participants located within the conference room may in some cases be interspersed with UI tiles for remote conference participants.

Furthermore, even where the UI tiles for the conference participants located within the conference room are grouped together, they may not be arranged according to the relative positions of those conference participants within the conference room (e.g., the order in which those conference participants are seated around the conference room). This may result in an unnatural feel for remote conference participants. For example, the UI tiles may be undesirably arranged in such a way that two participants who are talking to one another may appear to be looking away from one another within the UI of the conferencing software due to the arrangement of their respective UI tiles, despite looking at each other in the conference room.

Implementations of this disclosure address problems such as these by determining relative locations of conference participants within a conference room based on video data and positional data obtained from video capture devices within the conference room and generating output configured to cause an arrangement of UI tiles associated with those conference participants according to their relative locations. The relative locations of the conference participants within the conference room are determined based on the positional information, such as by defining coordinates for the conference participants within a coordinate system based on the positional information and the video data and determining the relative locations based on the coordinates. Output configured to cause a client application to arrange UI tiles associated with the conference participants is generated according to the relative locations. The output is then transmitted to one or more client devices to cause a UI of conferencing software at each of those client devices to display the UI tiles in the specified arrangement.

Figure 8:
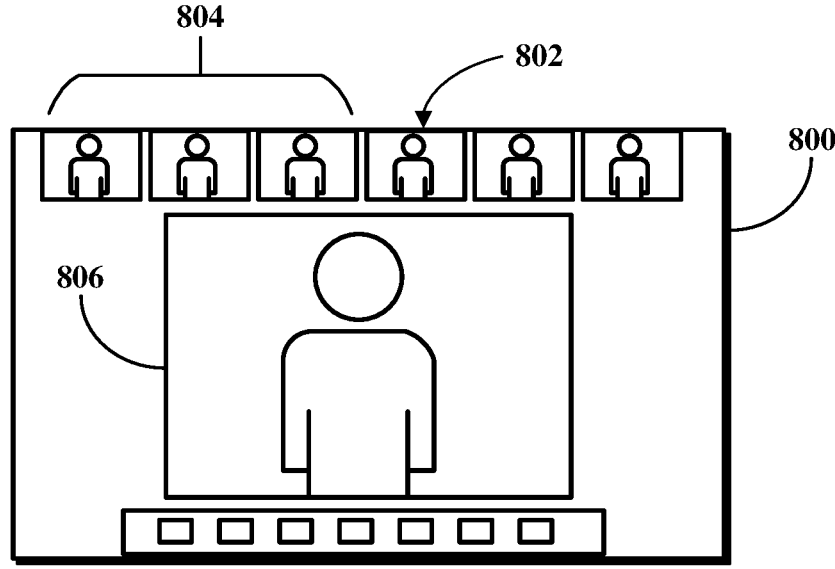
FIG. 8 is an illustration of a user interface of conferencing software within which UI tiles of conference participants are arranged.

As used herein, a "UI tile" refers to a portion of a conferencing software UI which displays a rendered video showing one or more conference participants. A UI tile may, but need not, be generally rectangular. The size of a UI tile may depend on one or more factors including the view style set for the conferencing software UI at a given time and whether the one or more conference participants represented by the UI tile are active speakers at a given time. The view style for the conferencing software UI, which may be uniformly configured for all conference participants by a host of the subject conference or which may be individually configured by each conference participant, may be one of a gallery view in which all UI tiles are similarly or identically sized and arranged in a generally grid layout or a speaker view in which one or more UI tiles for active speakers are enlarged and arranged in a center position of the conferencing software UI while the UI tiles for other conference participants are reduced in size and arranged near an edge of the conferencing software UI. Examples of UI tiles are shown in FIG. 8.

To describe some implementations in greater detail, reference is first made to examples of hardware and software structures used to implement a system for UI tile arrangement based on relative locations of conference participants. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
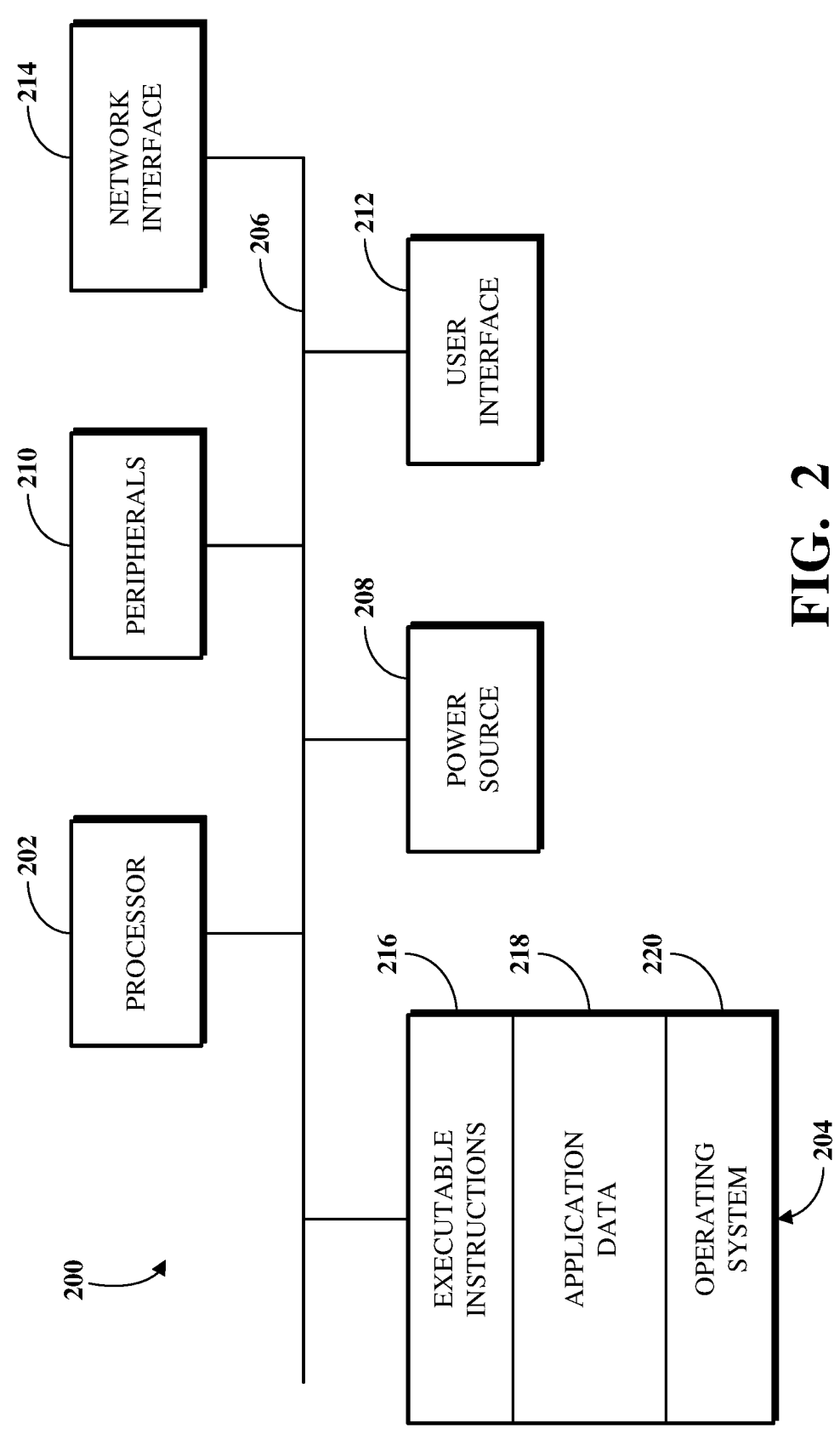
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from nonvolatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
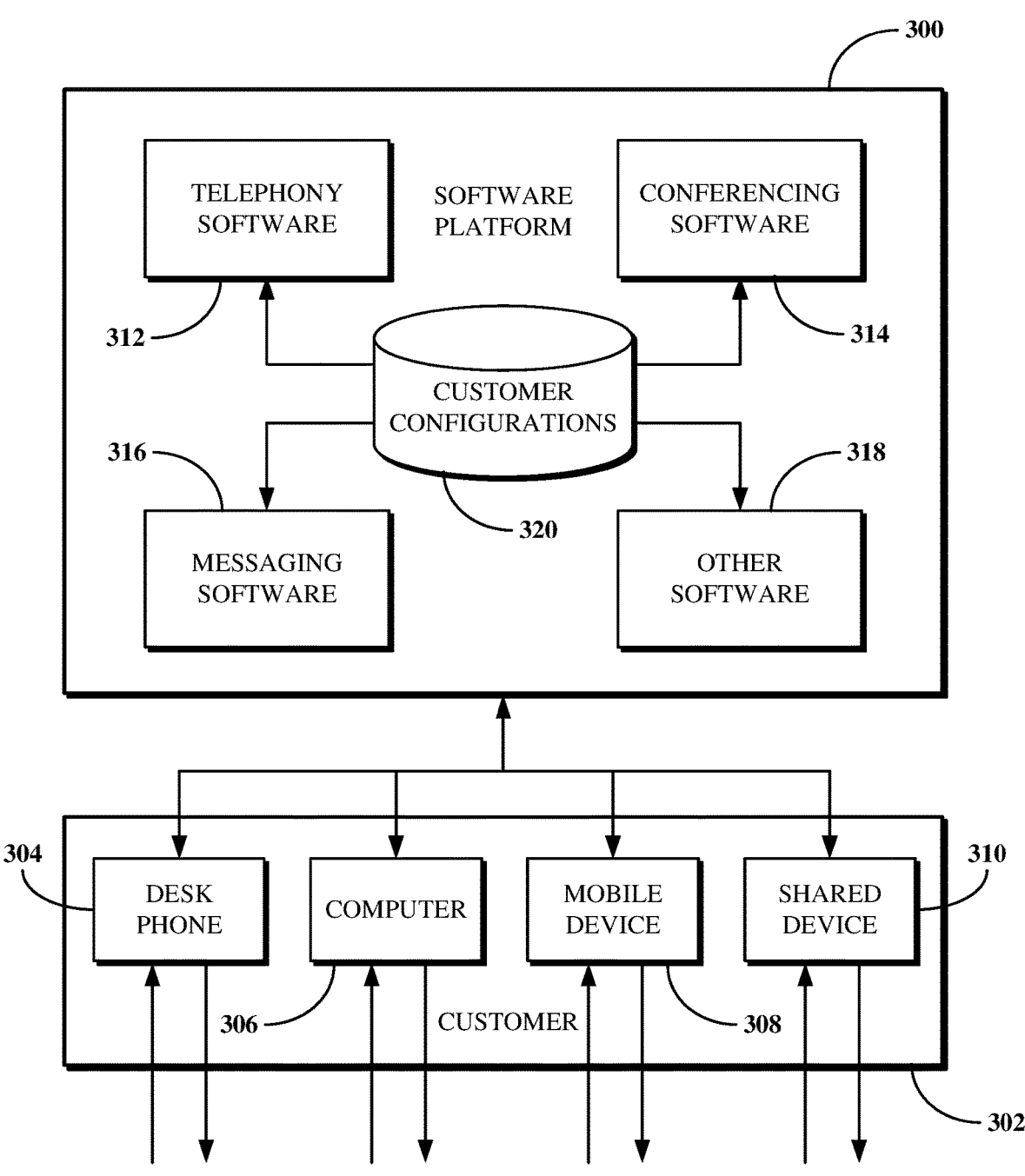
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may amongst the clients 304 through 310, for example, be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for determining relative locations of conference participants within a conference room and/or for generating output configured to cause software, such as a client application, to arrange UI tiles associated with conference participants according to those relative locations.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
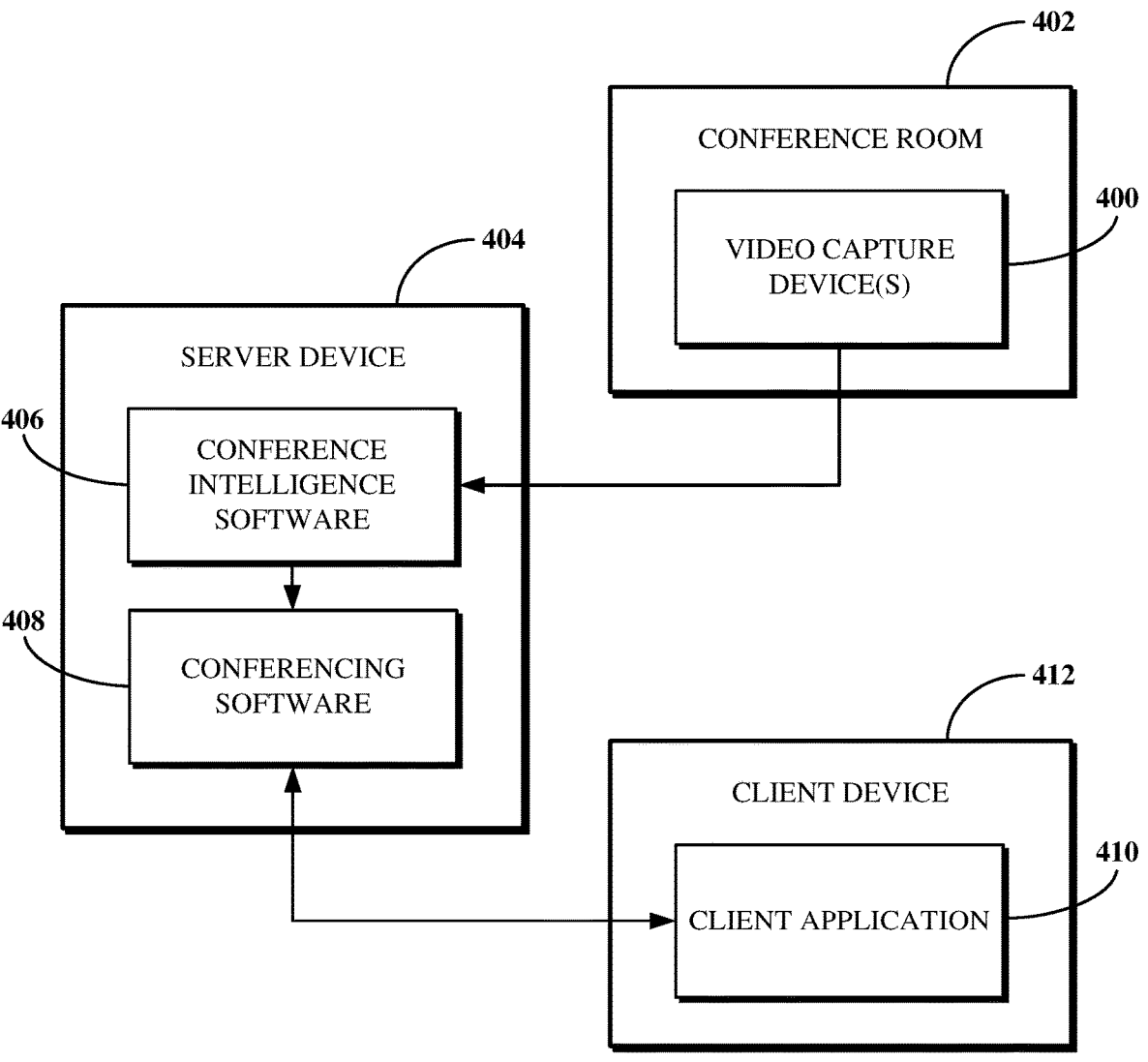
FIG. 4 is a block diagram of devices used with a system for UI tile arrangement based on relative locations of conference participants within a conference room.

FIG. 4 is a block diagram of devices used with a system for UI tile arrangement based on relative locations of conference participants within a conference room. In particular, one or more video capture devices 400 are used to capture video within a conference room 402, which is a physical space in which one or more conference participants are physically located during at least a portion of a conference. The one or more video capture devices 400 are cameras configured to record video data within the conference room 402. In one example, a single video capture device 400 may be arranged on a wall of the conference room 402. In another example, a first video capture device 400 may be arranged on a first wall of the conference room 402 and a second video capture device 400 may be arranged on a second wall of the conference room 402 perpendicular to the first wall. However, any number of video capture devices 400 may be arranged on any number of walls of the conference room 402.

Each video capture device 400 has a field of view within the conference room 402 based on an angle and position of the video capture device 400. The video capture devices 400 may be fixed such that their respective fields of view do not change. Alternatively, one or more of the video capture devices 400 may have mechanical or electronic pan, tilt, and/or zoom functionality for narrowing, broadening, or changing the field of view thereof. For example, the pan, tilt, and/or zoom functionality of a video capture device 400 may be electronically controlled, such as by a device operator or by a software intelligence aspect, such as a machine learning model or software which uses a machine learning model for field of view adjustment. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

A server device 404, which may, for example, be a server at the datacenter 106 shown in FIG. 1, runs software including conference intelligence software 406 and conferencing software 408. The conferencing software 408, which may, for example, be the conferencing software 314 shown in FIG. 3, implements a conference with two or more participants in which one or more of those participants are in the conference room 402 and one or more of those participants are remote participants located external to the conference room 402. The conference intelligence software 406 includes functionality for processing video data and positional information from the one or more video capture devices 400 located within the conference room 402 to determine relative locations of the conference participants within the conference room 402 and to generate output configured to cause UI tiles for the conference participants within the conference room to be arranged in a particular way within a UI of the conferencing software 408. In some implementations, the conferencing software 408 can include the conference intelligence software 406.

In particular, the output generated by the conference intelligence software 406 is configured to cause client applications running on client devices of remote participants, such as a client application 410 running on a client device 412, to arrange UI tiles associated with the conference participants within the conference room 402 according to their relative locations within the conference room 402. The client application 410 is software which communicates with the conferencing software 408 to enable the user of the client device 412 to participate in the conference implemented using the conferencing software 408 as a remote participant. The client device 412 may, for example, be one of the clients 304 through 310 shown in FIG. 3. The client device 412 includes one or more capture components, such as a camera, which capture input (e.g., video data) that is then transmitted to the conferencing software 408 for presentation within or otherwise through a UI of the conferencing software. For example, an input video stream from the client device 412 may be processed and output within a UI tile for the user of the client device 412 within the UI of the conferencing software 408.

The output configured to cause the arrangement of the UI tiles is or otherwise includes instructions, commands, data, and/or other information which can be processed to cause a specific arrangement of UI tiles representing the conference participants in the conference room 402 within a UI of the conferencing software 408. The conference intelligence software 406 transmits the output to the conferencing software 408, which uses the output to instruct the client application 410 to output the UI tiles in a specified arrangement or which passes those output to the client application 410 for use in outputting the UI tiles in the specified arrangement. In some implementations, the conferencing software 408 generates the output using data obtained from the conference intelligence software 406, such as data indicative of the relative locations of the conference participants within the conference room 402. For example, the conference intelligence software 406 may output information usable to generate the output, such as information identifying an arrangement for the UI tiles.

Each of the UI tiles represents one or more of the conference participants within the conference room 402. In some cases, where a field of view of a video capture device 400 includes only one conference participant, a stream of video data from that video capture device 400 can be rendered within a UI tile for that conference participant. In other cases, where a field of view of a video capture device 400 includes multiple conference participants, a stream of video data from that video capture device can be processed to determine regions of interest corresponding to those conference participants within the conference room 402 based on that video data. For example, the conference intelligence software 406 can include functionality for determining multiple regions of interest within a field of view of a video capture device 400 and for initializing output video streams for rendering within separate UI tiles of the conferencing software 408 for each of those regions of interest. The client application 410 then renders the output video streams within the respective UI tiles for viewing at the client device 412.

A region of interest generally refers to an area in which a conference participant is visible within video data. The conference intelligence software 406 can determine a region of interest within the conference room 402 based on video data from the video capture devices 400 in one or more ways. In one example, a region of interest can be determined by processing an input video stream obtained from a video capture device 400 to detect a number of people, as conference participants, within the field of view of the video capture device 400, as well as the locations of those conference participants within the conference room 402. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content. One or more regions of interest determined from an input video stream from a single video capture device 400 may then be separately rendered in their own UI tiles within the conferencing software 408.

In some implementations, the conference intelligence software 406 may further use audio data captured within the conference room 402 to determine the regions of interest to be represented within output video streams to render in UI tiles of the conference software 408. For example, the audio data may be captured using one or more audio capture devices (e.g., microphones) within the conference room 402. The audio data may be processed to determine the directions from which the audio data arrives at the audio capture devices. For example, a machine learning model trained for voice activity detection or a similar tool can process the audio data to detect when the audio data includes human vocal sounds, such as from a person talking. Upon detecting voice activity within the audio data, a machine learning model trained for direction of arrival processing or a similar tool can process the audio data to determine directions of arrival indicating where the voice activity is coming from within the conference room 402. The directions of arrival may then be used to determine a conversational context within the conference room 402, and, more specifically, within a subject field of view of a video capture device 400 determined based on video data from the video capture device 400. The conversational context may, for example, correspond to a context and/or length of a conversation between two or more conference participants within the conference room 402. A region of interest within the subject field of view to feature within a UI tile of the conferencing software 408 may then be based on the video data and the determined conversational context.

In some cases, multiple regions of interest may be determined for a single conference participant. For example, a conference participant may be included within the fields of view of two or more different video capture devices 400. In such a case, those multiple regions of interest may be treated as candidate regions of interest for the conference participant and evaluated to select one for use in an output video stream for rendering within a UI tile representing the conference participant. The candidate regions of interest may be evaluated using a machine learning model trained for facial recognition such as by scoring detections of a face of the subject conference participant within each of the candidate regions of interest according to one or more factors. Examples of the factors may include, but are not limited to, a size of the face of the conference participant, a percentage of the face of the conference participant which is visible (e.g., due to the conference participant facing one video capture device 400 and not another or due to differences in lighting captured by the video capture devices 400), and the presence of other conference participants within a threshold distance of the face of the conference participant. A candidate region of interest having the highest score may be selected and used for rendering within a UI tile representing the conference participant.

Names of the conference participants within the conference room 402 may be represented within respective UI tiles. In some cases, facial recognition can be performed (e.g., as its own process or as part of the process for detecting conference participants within the field of view of one or more of the video capture devices 400) to match images of the participants' faces against a data store. Responsive to a match between video data obtained from a video capture device and an image within the data store, a name associated with the image within the data store can be assigned to the subject conference participant. In other cases, where such a data store is unavailable or where such a facial recognition process does not result in a name being identified, audio data obtained from one or more audio capture devices within the conference room 402 can be processed to identify a name of the speaker. For example, a person within the conference room 402 may be a visitor to the office which includes the conference room 402. The person may introduce themselves at some point during the conference. The speech can be captured as audio data and processed to identify the name of that conference participant, which can then be assigned to that conference participant. When UI tiles for these conference participants are rendered within the conferencing software 408, the names of those conference participants may be presented in or nearby their respective UI tiles.

In some implementations, the conference intelligence software 406 may be implemented at each of the clients which connect to the conferencing software 408 to participate in a conference implemented thereby. For example, the conference intelligence software 406 may be implemented at the client device 412 instead of at the server device 404. In another example, the conference intelligence software 406 may be implemented at a client device within the conference room 402. Accordingly, the implementations of this disclosure may operate the conference intelligence software 406 at the server-side or at the client-side. For example, a client-side implementation of the conference intelligence software 406 may process information to be sent to the conferencing software 408 at the client, such as the client device 412, before it is sent to the conferencing software 408 and it may further process information received from the conferencing software 408 before that information is rendered using a client application, such as the client application 410.

In some implementations, the conferencing software 408 may include a participant list for displaying participants who are connected to a subject conference. Remote conference participants may be represented in a usual manner as individual conference participants. However, in some such implementations, the conference room 402 will be represented as an individual conference participant on the participant list. The conference participants located within the conference room 402 will be represented as sub-participants of the conference room 402 within the participant list. For example, the participant list may be nested such that the conference room 402 is represented by a parent element within the participant list and the conference participants located within the conference room may be represented by child elements nested underneath the parent element. In some cases, the parent element can be expanded by a user clicking on it to reveal the child elements within the participant list and thereafter collapsed by clicking on the parent element to hide the child elements within the participant list. In some such implementations, the names of the conference participants as presented as sub-participants in the participant list may be determined as described above.

In some implementations, remote conference participants may be able to message individual conference participants within the conference room 402 using the UI tiles representing those conference participants or using the participant list. For example, a conference participant within the conference room may have a companion device connected to the conferencing software 408. In some cases, the companion device may have a direct connection to the server device 404, such as using a network interface. In other cases, the companion device may connect to the server device 404 through an intermediary, such as a client device located within the conference room 402. The availability of a companion device for a given conference participant may be indicated within the UI tile for that conference participant and/or by his or her name in the participant list. A remote participant may thus interact with a UI tile and/or participant list to initiate a chat with that conference participant. In another example, where shared devices or other devices within the conference room 402 are available, those devices may be paired to the respective conference participants either manually based on user configuration or automatically based on a positional mapping of the devices and participants. In either such case, the paired conference participants may thus use those devices as companion devices.

Figure 5:
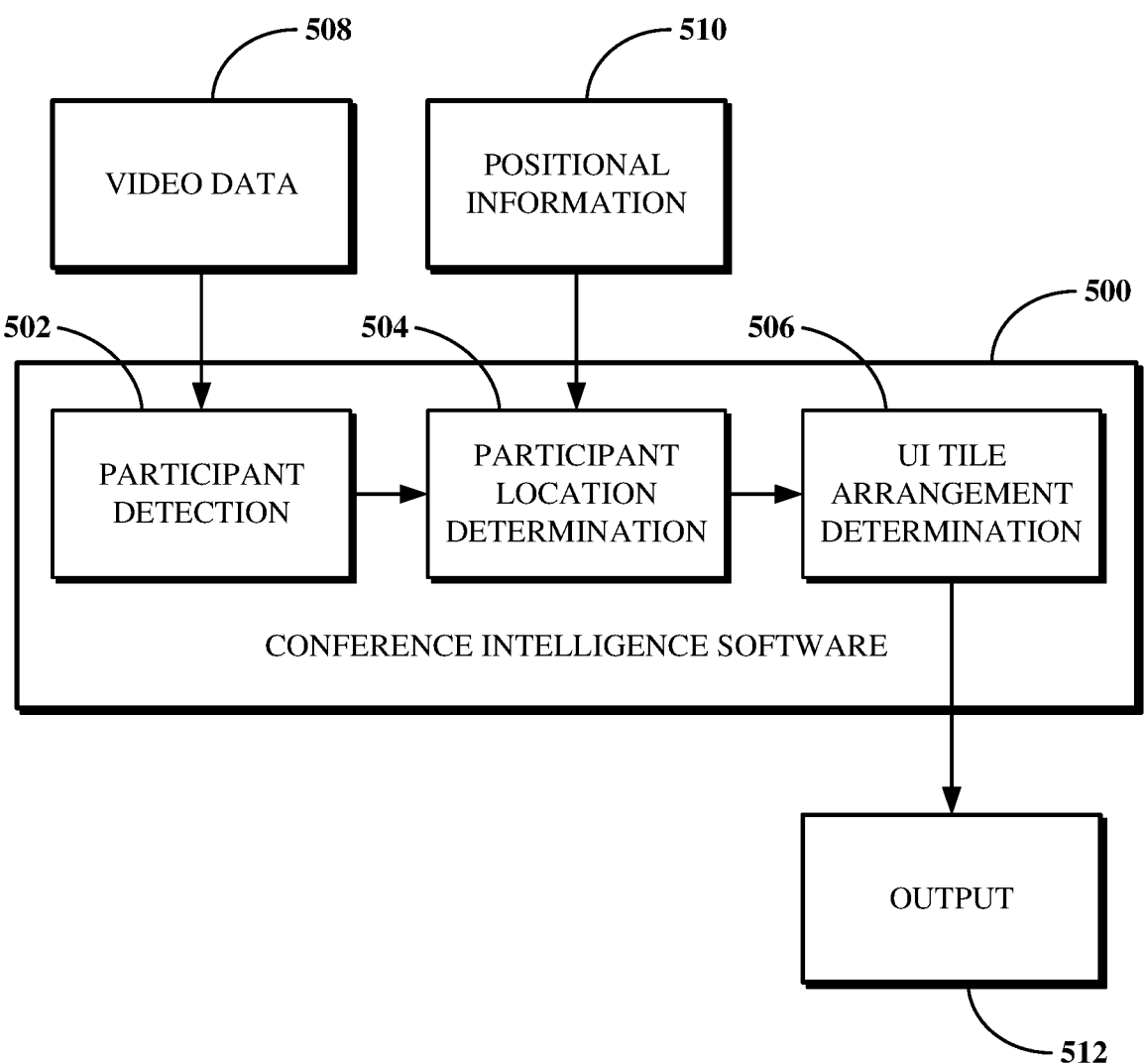
FIG. 5 is a block diagram of an example of conference intelligence software.

FIG. 5 is a block diagram of an example of conference intelligence software 500, which may, for example, be the conference intelligence software 406 shown in FIG. 4. The conference intelligence software 500 includes tools, such as programs, subprograms, functions, routines, subroutines, operations, and/or the like for determining relative locations of conference participants within a conference room and/or for generating output configured to cause software, such as a client application, to arrange UI tiles associated with conference participants according to those relative locations. As shown, the device mode designation software 500 includes a participant detection tool 502, a participant location determination tool 504, and a UI tile arrangement determination tool 506.

The participant detection tool 502 detects conference participants within a conference room based on video data 508 obtained from one or more video capture devices, for example, the video capture devices 400 shown in FIG. 4. The video data 508 is data included in input video streams generated at and/or transmitted from the video capture devices. The one or more video capture devices may be arranged in some way around the conference room, such as on one or more walls thereof. Each of the video capture devices has a field of view which may be partially overlapping. As such, the video data 508 obtained from each of the video capture devices may include different objects, such as humans. The video data is processed to determine one or more regions of interest within the field of view of each video capture device, such as using a machine learning model trained for object detection, facial recognition, or other segmentation. Each of the regions of interest includes a portion of the video data 508 which corresponds to a conference participant. Accordingly, the conference participants are detected within the regions of interest.

The participant location determination tool 504 determines relative locations of the detected conference participants using positional information 510 obtained from the video capture devices from which the video data 508 is also obtained. The positional information 510 for the video capture devices indicates an arrangement of those video capture devices within the conference room. In one example, where there are two video capture devices within the conference room, the positional information 510 for one of them may identify that it is a leftmost video capture device within the conference room and the positional information 510 for the other may identify that it is a rightmost video capture device within the conference room.

In another example, where there are three or more video capture devices within the conference room, the positional information 510 for one video capture device may identify that it is a leftmost video capture device, the positional information 510 for another video capture device may identify that it is a rightmost video capture device within the conference room, and the positional information 510 for each remaining video capture device may identify that it is a central video capture device within the conference room.

The quality of a device being a leftmost, rightmost, or central device may be in relation to a front wall of the conference room, an entry to the conference room, or another aspect manually defined by a user or automatically defined by the system. In some cases, a numbering, alphabetical, or other scheme may be used to indicate the arrangement of the video capture devices within the conference room rather than using positional labels such as left, right, and center.

To determine the relative locations of the conference participants within the conference room based on the positional information 510, the participant location determination tool 504 determines a common coordinate system based on overlapping fields of view of the video capture devices, defines coordinates for each of the conference participants within a coordinate system based on the positional information 510 and the video data 508, and determines the relative locations based on the coordinates. In particular, a coordinate system is determined based on the video data 508 obtained from the one or more video capture devices, and coordinates for each of the conference participants are defined based on both the video data 508 and the positional information 510. The relative locations of the conference participants are then determined based on those coordinates. For example, the positional information can be used to place or map out conference participants detected within the video data 508 from various video capture devices according to some expressible location in one or more dimensions based on the positional designations of those video capture devices within the conference room according to the positional information 510.

Each detected conference participant is mapped to the coordinate system to determine the relative location thereof. For example, a leftmost participant identified within a video feed from a leftmost video capture device will be located at a left side of the coordinate system, a rightmost participant identified within the same video feed will be located to the right of that first participant, a rightmost participant identified within a video feed from a central or rightmost video capture device will be located still further to the right of that participant, and so on. Accordingly, the order in which the conference participants appear in the fields of view of the video capture devices ordered by the arrangement of the video capture devices can be considered to identify or otherwise be used to identify the relative locations of the conference participants.

The coordinate system may be some multi-dimensional grid representation of a space which includes overlapping fields of view of the video capture devices. Coordinates defined for a conference participant within the coordinate system refer to values within one or more dimensions for relating a position of the conference participant with respect to other conference participants detected within the conference room. For example, a single dimensional value [X] may be used to indicate positions of the conference participants within the coordinate system. A point of origin of the coordinate system may be defined in one or more ways. In some cases, a video capture device may be designated as a main video capture device within the conference room, such as based on higher capacity video capture functionality (e.g., a highest resolution camera), a particular location within the conference room (e.g., a front wall), or other factors, in which a center point of the field of view of that main video capture device may be used as the point of origin within the center of the coordinate system. In other cases, a center of the field of view for a video capture device identified by the positional information 510 as being a central video capture device may be used as the point of origin within the center of the coordinate system. In still other cases, a bottom-leftmost pixel represented within a field of view of a leftmost video capture device within the conference room may be used as the point of origin at a bottom-left of the coordinate system. In one example, where a single dimensional value [X] indicates positions of conference participants within the coordinate system and the point of origin of the coordinate system is a center-most value of the coordinate system, coordinates defined for a first (leftmost) conference participant may be [−5], coordinates defined for a second (central) conference participant may be [0], and coordinates defined for a third (rightmost) conference participant may be [5].

Where multiple video capture devices are used and each of them has a same orientation relative to the conference room (i.e., such that they are all mounted on the same wall or otherwise facing the same direction), the coordinate system will be the same for all of them but may simply be expanded to cover all of their fields of view. However, where some video capture devices have different orientations, a common coordinate system is determined to relate locations of conference participants within all of the video feeds together using a single coordinate system. Determining the common coordinate system can include using overlapping fields of view of the video capture devices to calculate a single plane that extends through all of the fields of view.

In some implementations, the relative positions of the conference participants within the conference room can be determined based on audio data in addition to or instead of the video data. For example, audio data captured using one or more audio capture devices within the conference room can be processed to detect speech in directions of those audio capture devices. The video data 508 may be processed to determine which conference participants are the speakers of the speech at a given time based on the directions of audio determined based on the audio data. In some cases, the video data 508 processing based on the audio data can include detecting visual speech patterns such as mouth movements which align timewise with the detected speech.

The UI tile arrangement determination tool 506 determines an arrangement of UI tiles representing the conference participants based on the relative locations of the conference participants. In particular, because we can understand where the conference participants are with respect to one another within the conference room from the determined relative locations, we can determine a specific arrangement by which to order the UI tiles associated with the conference participants within a UI of the conferencing software. In this way, all of the UI tiles representing the conference participants are both grouped together and presented in an order matching the order in which the conference participants are within the conference room. The UI tile arrangement determination tool 506 may generate output 512 configured to cause a client application to arrange the UI tiles for the conference participants according to the relative locations determined for the conference participants. Alternatively, the UI tile arrangement determination tool 506 may generate data usable by another software aspect, for example, the conferencing software, to generate the output 512.

At some point in time during the conference after the output 512 is used to cause an arrangement of the UI tiles, the conference participants within the conference room may change. For example, new conference participants may enter the conference room, existing conference participants may leave the conference room, and/or conference participants may change seats. The conference intelligence software 500 is configured either on a continuous basis (e.g., once per minute) or in response to a triggering event (e.g., a motion threshold being met for some period of time or for some calculated distance) to repeat some or all of the processes described above with respect to the participant detection tool 502, the participant location determination tool 504, and the UI tile arrangement determination tool 506. For example, the conference intelligence software 500 may, on a continuous basis or in response to a triggering event, perform face detection (or cause face detection to be performed) to identify the conference participants within the conference room and to recompute the relative locations of those conference participants. Where no change has resulted, the existing arrangement of UI tiles may remain; however, where a change has resulted, new output configured to cause a rearrangement of the UI tiles may be generated.

Figure 6:
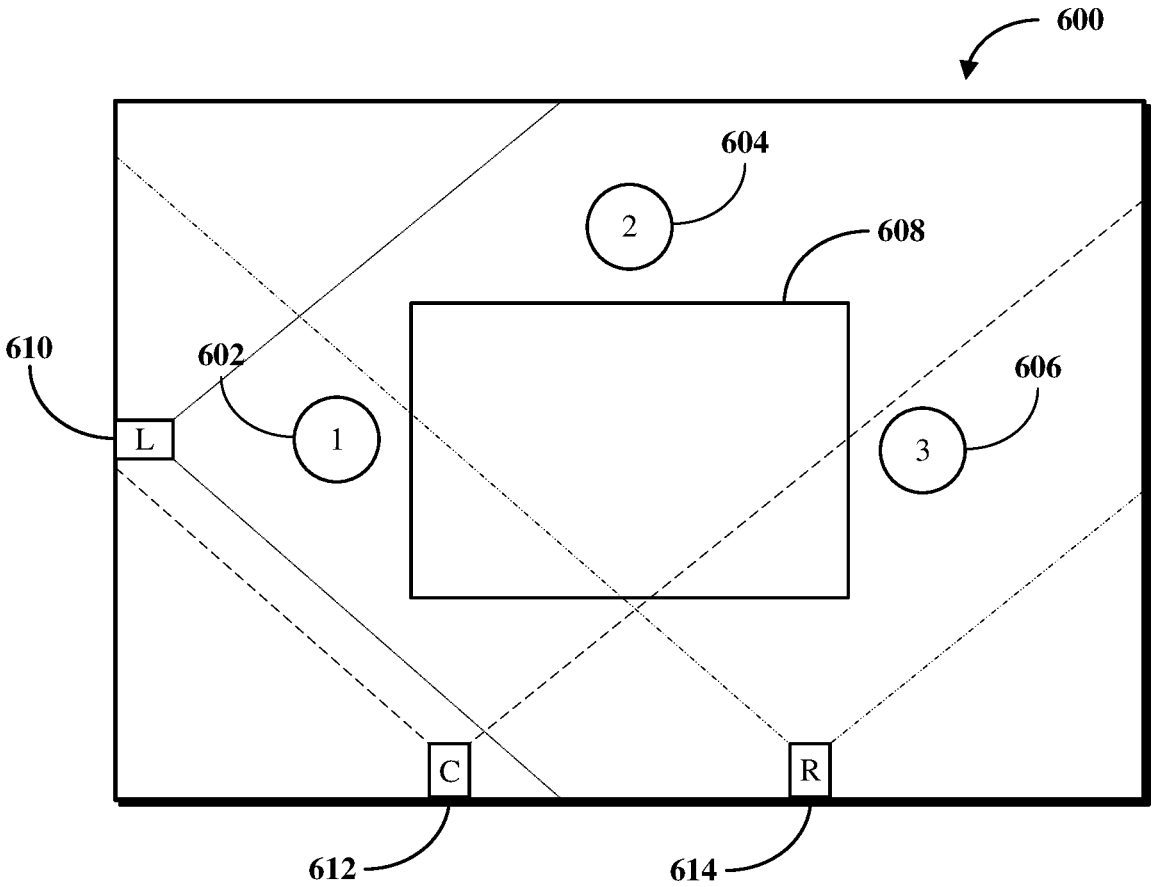
FIG. 6 is an illustration of an example of a conference room within which conference participants are located.

To illustrate the FIG. 6 is an illustration of an example of a conference room 600 within which conference participants 602, 604, and 606 are located. The conference participants 602, 604, and 606, who are respectively labeled as participants 1, 2, and 3, are seated around a conference table 608. Video capture devices 610, 612, and 614, such as cameras, are located within the conference room 600. In particular, the video capture device 610, which is labeled as video capture device L (i.e., left), is arranged on a first wall of the conference room 600 and the video capture devices 612 and 614, which are respectively labeled as video capture devices C and R (i.e., center and right), are each arranged on a second wall of the conference room 600 perpendicular to the first wall. Each of the video capture devices 610, 612, and 614 has a field of view, which, as shown, are partially overlapping. In particular, all three of the conference participants 602, 604, and 606 are within the field of view of the video capture device 610, only the conference participants 602 and 604 are within the field of view of the video capture device 612, and only the conference participants 604 and 606 are within then field of view of the video capture device 614.

Video data from the video capture devices 610, 612, and 614 is used to represent the conference participants within UI tiles of conferencing software (e.g., the conferencing software 408 shown in FIG. 4). Conference intelligence software (e.g., the conference intelligence software 406 shown in FIG. 4 or the conference intelligence software 500 shown in FIG. 5, to the extent different) associated with the conferencing software determines which video data to use for a UI tile of a given conference participant within the conference room 600 based on a best view of the conference participant at a given time within the various video data streams that include the conference participant. In some cases, a video data stream from a video capture device may not include a conference participant. For example, the field of view of the video capture device 612 does not include the conference participant 606, and so video data from the video capture device 612 cannot be used to represent the conference participant 606. Similarly, the field of view of the video capture device 614 does not include the conference participant 602, and so video data from the video capture device 614 cannot be used to represent the conference participant 602.

In other cases, a video data stream from a video capture device may include a conference participant but not from a desirable angle or distance. For example, even though the conference participants 602 and 606 are included within the field of view of the video capture device 610, video data from the video capture device 610 should not be used for a UI tile of the conference participant 602 because the conference participant is facing away from the video capture device 610, and such video data may be less useful for the UI tile of the conference participant 606 than video data from the video capture device 614 because the conference participant is farther away from the video capture device 610 than the video capture device 614. However, the direction a conference participant is facing may be weighted more heavily than a distance the conference participant is from a given video capture device when determining which video capture device's video data to use for the UI tile of the conference participant. For example, even though the conference participant 606 is farther away from the video capture device 610 than the video capture device 614, video data from the video capture device 610 may include a better representation of the conference participant 606 when the conference participant is facing the conference participant 602 (and thus the video capture device 610).

As has been discussed, the video data from a single video capture device can be processed to produce separate output video streams to be rendered within different UI tiles for multiple conference participants. For example, the video data from the video capture device 612 can be processed to produce a first output video stream to be rendered by the conferencing software within a UI tile for the conference participant 602 and a second output video stream to be rendered by the conferencing software within a UI tile for the conference participant 604. In another example, the video data from the video capture device 614 can be processed to produce a first output video stream to be rendered by the conferencing software within a UI tile for the conference participant 604 and a second output video stream to be rendered by the conferencing software within a UI tile for the conference participant 606. Generally, each conference participant is represented within the conferencing software using a single UI tile, so in the examples described above, the video data from the video capture device 612 or the video data from the video capture device 614 would be used for the conference participant 604, but not both. The particular video data to use may be determined as described above.

To ensure that the UI tiles for the conference participants 602, 604, and 606 are arranged in the same order as those conference participants appear in the conference room 600, a coordinate system is determined based on the overlapping fields of view of two or more of the video capture devices 610, 612, and 614. The coordinate system represents positions of subject conference participants on a multi-dimensional manifold. In particular, the coordinate system is used to place positions of subject conference participants on a plane which connects the subject video capture devices. In cases where the subject video capture devices are all facing same direction, as with the video capture devices 612 and 614, the coordinate system may be determined with respect to a plane which is parallel to the video capture devices 612 and 614 (e.g., perpendicular to the direction in which the video capture devices 612 and 614 are facing). In other cases, where the subject video capture devices are facing different directions, as with the video capture devices 610 and 612, the coordinate system may be determined with respect to a plane which intersects the video capture devices 610 and 612.

Figure 7:
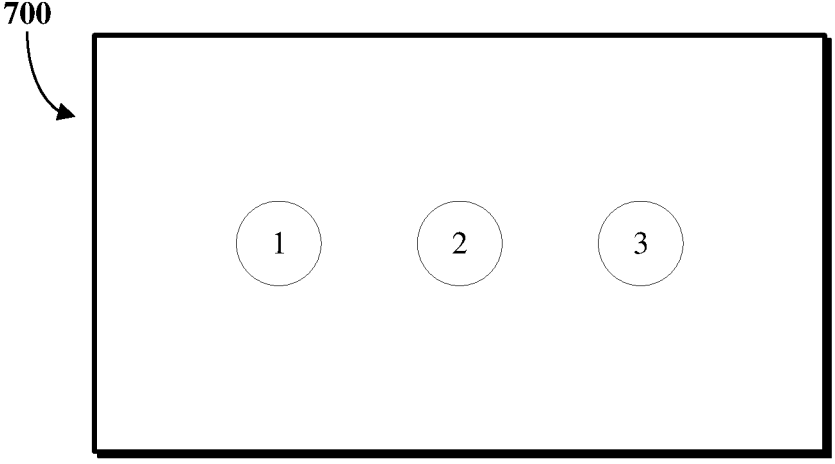
FIG. 7 is an illustration of a plane showing relative locations of conference participants within a conference room based on a coordinate system.

FIG. 7 is an illustration of a plane 700 showing relative locations of conference participants within a conference room, for example, the conference room 600 shown in FIG. 6, based on a coordinate system. In this example, the plane 700 is determined with reference to two or more video capture devices, such as the video capture devices 610, 612, and 614 shown in FIG. 4. The conference participants whose positions are depicted in the plane 700 are labeled participant 1, participant 2, and participant 3, as with the conference participants 602, 604, and 606 shown in FIG. 6, respectively. In particular, the participant 1 is shown to the left the participant 2, who is shown to the left of the participant 3.

With reference to FIG. 6, the plane 700 and its underlying coordinate system may be determined using video data and positional information obtained from the video capture devices 610, 612, and 614. For example, the positional information from the video capture device 610 may indicate that it is a leftmost video capture device, the positional information from the video capture device 614 may indicate that it is a rightmost video capture device, and the positional information from the video capture device 612 may indicate that it is a central video capture device. This is consistent with the labeling of the video capture devices 610, 612, and 614 as respectively being L, C, and R. The positional information is defined based on a physical arrangement of the video capture devices within the conference room relative to one another.

FIG. 8 is an illustration of a UI 800 of conferencing software, for example, the conferencing software 408 shown in FIG. 4, within which UI tiles 802 associated with conference participants are arranged according to output generated based on relative locations of conference participants within a conference room, for example, the output 512 shown in FIG. 5. The UI tiles 802 include UI tiles associated with remote conference participants and a subset 804 associated with conference participants within the conference room. The subset 804 is arranged in a group so that all of the UI tiles associated with the conference participants within the conference room are grouped together and also in a specified order according to the determined relative locations of those conference participants. A large UI tile 806 represents an active speaker at a given time during the conference. Depending on who the active speaker is, the UI tile 806 may or may not belong to the subset 804.

To further describe some implementations in greater detail, reference is next made to examples of techniques which may be performed by or using a system for UI tile arrangement based on relative locations of conference participants. FIG. 9 is a flowchart of an example of a technique 900 for UI tile arrangement based on relative locations of conference participants within a conference room. FIG. 10 is a flowchart of an example of a technique 1000 for rearranging UI tiles based on changes of or to conference participants within a conference room.

The technique 900 and/or the technique 1000 can be executed using computing devices, such as the systems, hardware, and software described with respect to FIGS. 1-8. The technique 900 and/or the technique 1000 can be performed, for example, by executing a machine-readable program or other computer-executable instructions, such as routines, instructions, programs, or other code. The steps, or operations, of the technique 900 and/or the technique 1000 or another technique, method, process, or algorithm described in connection with the implementations disclosed herein can be implemented directly in hardware, firmware, software executed by hardware, circuitry, or a combination thereof.

For simplicity of explanation, the technique 900 and the technique 1000 are each depicted and described herein as a series of steps or operations. However, the steps or operations in accordance with this disclosure can occur in various orders and/or concurrently. Additionally, other steps or operations not presented and described herein may be used.

Furthermore, not all illustrated steps or operations may be required to implement a technique in accordance with the disclosed subject matter.

Referring first to FIG. 9, the technique 900 for UI tile arrangement based on relative locations of conference participants within a conference room is shown. At 902, positional information and video data are obtained from one or more video capture devices located within a conference room. The positional information indicates an arrangement of the video capture devices within the conference room. For example, the positional information obtained from one of the one or more video capture devices may indicate whether the video capture device is a leftmost video capture device, a rightmost video capture device, or a central video capture device. The video data is data included in input video streams generated at and/or transmitted from the video capture devices.

At 904, conference participants are detected within the video data. Detecting the conference participants within the video data can include processing the video data to determine regions of interest corresponding to human faces detected within the video data. For example, detecting conference participants may include using a machine learning model to draw bounding boxes around objects detected as having human faces within the video data. One or more regions of interest may be determined within an input video stream included as video data from a video capture device.

At 906, coordinates are defined for the detected conference participants within a coordinate system based on the positional information. The coordinates refer to values in one or more dimensions along a coordinate system determined based on the positional information and the video data. The coordinate system is determined based on fields of view of the video capture devices. For example, where there are multiple video capture devices within the conference room, a common coordinate system may be determined based on overlapping fields of view of those multiple video capture devices.

At 908, relative locations of the conference participants within the conference room are determined based on the defined coordinates. Values of the coordinates defined for each of the conference participants within the conference room are compared to one another to determine an order in which the conference participants are within the conference room. In one example, the conference participants may be ordered from lowest to highest coordinate values. For example, for coordinates defined for a first (leftmost) conference participant as [−5], coordinates defined for a second (central) conference participant as [0], and coordinates defined for a third (rightmost) conference participant as [5], the relative locations of those conference participants may specify that the first conference participant is to the left of the second conference participant, who is to the left of the third conference participant.

At 910, output configured to cause a specified arrangement of UI tiles for the conference participants is generated. The output is generated according to the determined relative locations of the conference participants. The output indicates to group all of the UI tiles together and specifies an order in which to present the UI tiles within a UI of conferencing software. As such, the output is configured to cause a client application to arrange UI tiles associated with the conference participants according to the relative locations.

At 912, the output is transmitted to one or more client devices. The client devices are or otherwise include devices used by remote conference participants and which run client applications for accessing the conferencing software. In some implementations, a remote conference participant, as a user of one of the client devices, may choose to rearrange the UI tiles despite the specified arrangement initially caused by the output transmitted to the client device.

In some implementations, names of the conference participants presented in the UI of the conferencing software are determined by processing one or both of video data obtained from the one or more video capture devices or audio data obtained from one or more audio capture devices within the conference room. In some such implementations, the names of the conference participants are presented within a participant list of the conferencing software. In some implementations, a participant list presented within the conferencing software identifies the conference room as a participant and each of the conference participants as sub-participants of the conference room. In some such implementations, information represented for a conference participant within the participant list indicates whether a companion device associated with the conference participant is available for messaging.

Referring next to FIG. 10, the technique 1000 for rearranging UI tiles based on changes of or to conference participants within a conference room is shown. At 1002, coordinates are defined for conference participants within a conference room within a coordinate system. For example, the coordinates may be defined for the conference participants within the conference room as described above with respect to the technique 900 shown in FIG. 9.

At 1004, a change is detected with respect to one or more conference participants within video data obtained from one or more video capture devices located within the conference room. The change is in one or both of a number of the conference participants or locations of one or more of the conference participants within the conference room. The change may be detected by continuous monitoring of the video data obtained from the video capture devices within the conference room or in response to a triggering event detected based on such video data.

At 1006, new coordinates for each of the conference participants are defined based on the detected change. In particular, in response to the detected change, coordinates previously defined for conference participants who remain detected within the video data obtained from the video capture devices despite the detected change can be re-used, however new coordinates will be defined for conference participants for whom coordinates were not previously defined or for whom previously defined coordinates are no longer valid (i.e., because the conference participants left the conference room or moved to another location within the conference room). Because the same video capture devices having the same fields of view are still being used, a the previously determined coordinate system may be re-used.

At 1008, new relative locations of the conference participants within the conference room are determined based on the new coordinates. Values of the new coordinates defined for each of the conference participants within the conference room are compared to one another to determine an order in which the conference participants are within the conference room.

At 1010, output configured to cause a specified rearrangement of UI tiles for the conference participants is generated. The output is generated according to the new relative locations of the conference participants. The output indicates to group all of the UI tiles together and specifies an order in which to present the UI tiles within a UI of conferencing software. As such, the output is configured to cause a client application to rearrange UI tiles associated with the conference participants according to the new relative locations.

At 1012, the output, which may be considered as second output in some cases, is transmitted to one or more client devices. The client devices are or otherwise include devices used by remote conference participants and which run client applications for accessing the conferencing software. In some implementations, a remote conference participant, as a user of one of the client devices, may choose to further rearrange the UI tiles despite the specified rearrangement initially caused by the output transmitted to the client device.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media (e.g., as a non-transitory computer readable medium storing instructions operable to cause one or more processors to perform operations), and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
obtaining positional information from multiple cameras within a room;
determining, using a common coordinate system associated with the multiple cameras, relative locations of conference participants within the room based on the positional information and overlapping fields of view of the multiple cameras, wherein a first subset of the conference participants are within a first field of view of a first camera of the multiple cameras, a second subset of the conference participants are within a second field of view of a second camera of the multiple cameras, and the overlapping fields of view include the first field of view and the second field of view; and
causing a client application to arrange user interface tiles associated with the conference participants according to the relative locations.

2. The method of claim 1, wherein determining the relative locations of the conference participants within the room comprises:
defining coordinates for each of the conference participants within the common coordinate system based on the positional information and video data obtained from the multiple cameras; and
determining the relative locations based on the coordinates.

3. The method of claim 1, further comprising:
causing the client application to group the user interface tiles together and specifying, to the client application, an order in which to present the user interface tiles within a user interface of conferencing software.

4. The method of claim 1, wherein a participant list presented within conferencing software identifies the room as a participant and each of the conference participants as sub-participants of the room.

5. The method of claim 1, wherein information represented for a conference participant within a participant list indicates whether a companion device associated with the conference participant is available for messaging.

6. The method of claim 1, further comprising:
determining at least two regions of interest within the room based on a video stream obtained from one of the multiple cameras, wherein each of the at least two regions of interest corresponds to one or more of the conference participants; and
producing an output video stream for rendering within the user interface tiles for each of the at least two regions of interest.

7. The method of claim 1, further comprising:
causing the client application to rearrange the user interface tiles based on a change in one or both of a number of the conference participants or locations of one or more of the conference participants within the room.

8. The method of claim 7, wherein the change in the one or both of the number of the conference participants or the locations of the one or more of the conference participants within the room is detected in response to a triggering event.

9. The method of claim 1, wherein the positional information obtained from a camera of the multiple cameras indicates whether the camera is a leftmost camera, a rightmost camera, or a central camera.

10. An apparatus, comprising:
a memory; and
a processor configured to execute instructions stored in the memory to:
obtain positional information from multiple cameras within a room;
determine, using a common coordinate system associated with the multiple cameras, relative locations of conference participants within the room based on the positional information and overlapping fields of view of the multiple cameras, wherein a first subset of the conference participants are within a first field of view of a first camera of the multiple cameras, a second subset of the conference participants are within a second field of view of a second camera of the multiple cameras, and the overlapping fields of view include the first field of view and the second field of view; and
cause a client application to arrange user interface tiles associated with the conference participants according to the relative locations.

11. The apparatus of claim 10, wherein, to determine the relative locations of the conference participants within the room, the processor is configured to execute the instructions to:
define coordinates for each of the conference participants within the common coordinate system based on the positional information and video data obtained from the multiple cameras; and
determine the relative locations based on the coordinates.

12. The apparatus of claim 10, wherein the processor is configured to execute the instructions to:
cause the client application to group the user interface tiles together; and
specify, to the client application, an order in which to present the user interface tiles within a user interface of conferencing software.

13. The apparatus of claim 10, wherein names of the conference participants presented in the user interface of conferencing software are determined by processing one or both of video data obtained from the multiple cameras and audio data obtained from one or more audio capture devices within the room.

14. The apparatus of claim 10, wherein names of the conference participants are presented within a participant list of conferencing software.

15. The apparatus of claim 10, wherein the processor is configured to execute the instructions to:
determine at least two regions of interest within the room based on a video stream obtained from one of the multiple cameras, wherein each of the at least two regions of interest corresponds to one or more of the conference participants; and produce an output video stream for rendering within the user interface tiles for each of the at least two regions of interest.

16. The apparatus of claim 10, wherein the processor is configured to execute the instructions to:

cause the client application to rearrange the user interface tiles based on a change in one or both of a number of the conference participants or locations of one or more of the conference participants within the room.

17. A non-transitory computer readable medium storing instructions operable to cause one or more processors to perform operations comprising:

obtaining positional information from multiple cameras within a room;

determining, using a common coordinate system associated with the multiple cameras, relative locations of conference participants within the room based on the positional information and overlapping fields of view of the multiple cameras, wherein a first subset of the conference participants are within a first field of view of a first camera of the multiple cameras, a second subset of the conference participants are within a second field of view of a second camera of the multiple cameras, and the overlapping fields of view include the first field of view and the second field of view; and causing a client application to arrange user interface tiles associated with the conference participants according to the relative locations.

18. The non-transitory computer readable medium of claim 17, wherein the operations further comprise:

causing the client application to group the user interface tiles together; and specifying, to the client application, an order in which to present the user interface tiles within a user interface of conferencing software.

19. The non-transitory computer readable medium of claim 17, wherein the operations for determining the relative locations of the conference participants based on the positional information comprise:

defining coordinates for each of the conference participants within the common coordinate system based on the positional information and video data obtained from the multiple cameras; and determining the relative locations based on the coordinates.

20. The non-transitory computer readable medium of claim 17, wherein the operations further comprise:

determining at least two regions of interest within the room based on a video stream obtained from one of the multiple cameras, wherein each of the at least two regions of interest corresponds to one or more of the conference participants; and producing an output video stream for rendering within the user interface tiles for each of the at least two regions of interest.

* * * * *